May 3, 1932. S. E. BAILOR 1,856,368
CULTIVATOR LIFTING GEAR
Filed June 23, 1930
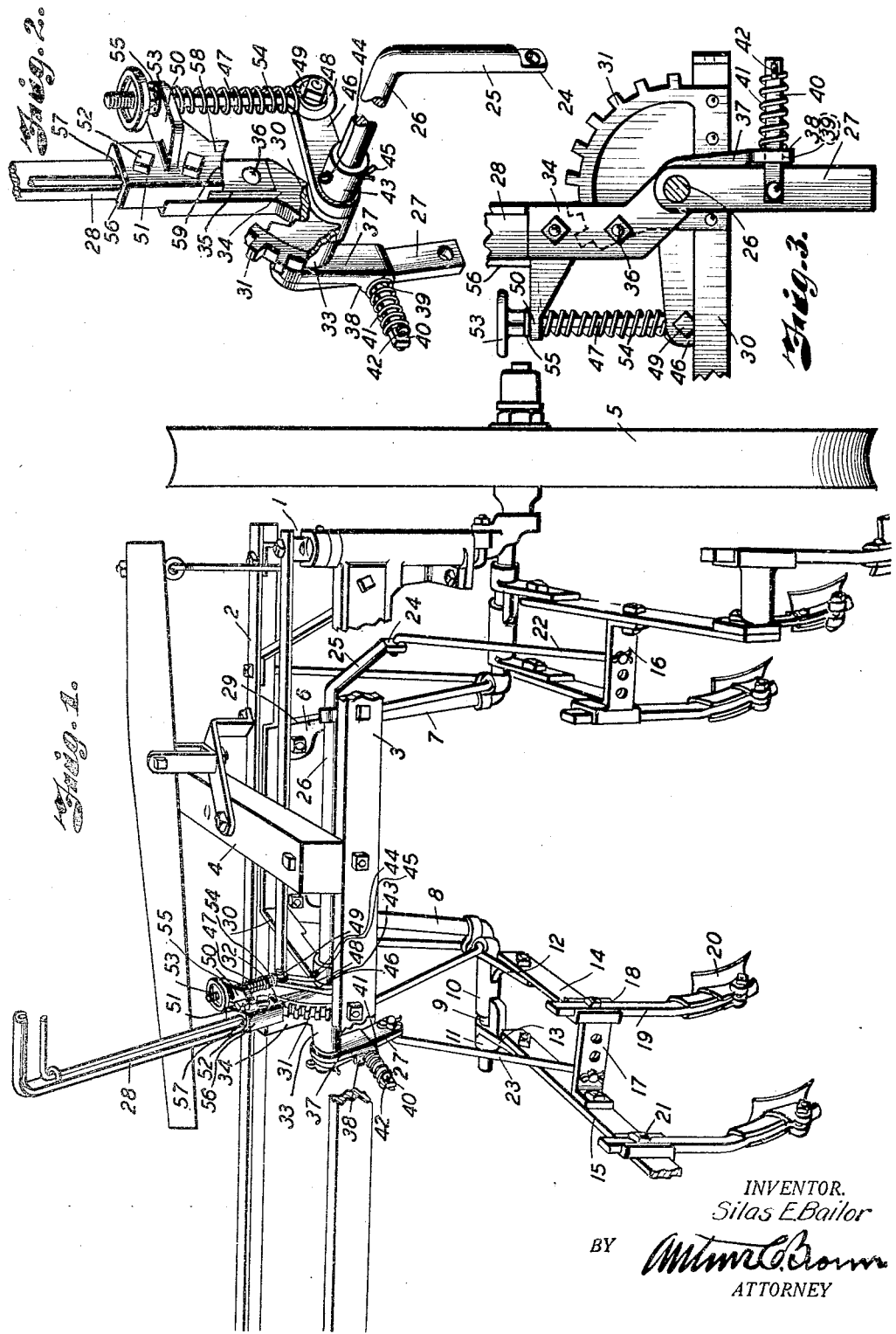
INVENTOR.
Silas E. Bailor
BY Arthur C. Brown
ATTORNEY Patented May 3, 1932

1,856,368

UNITED STATES PATENT OFFICE

SILAS E. BAILOR, OF DILL, OKLAHOMA

CULTIVATOR LIFTING GEAR

Application filed June 23, 1930. Serial No. 463,257.

My invention relates to cultivators and more particularly to devices of that character including pivotally mounted shovel beams supporting shovels in laterally spaced relation, and gear for lifting and lowering the shovels and maintaining the same in a desired position for suitable penetration of the ground over which the cultivator is moving.

The principal objects of my invention are to provide for adjustment of gangs of shovels with respect to each other, to embody shovel-adjusting means in the common lifting gear of a plurality of shovels, and to provide lifting gear in which one gang of shovels may be adjusted with reference to the other gang.

In accomplishing these and other objects of my invention, I have provided improved details of structure, the preferred forms of which are illustrated in the accompanying drawings, wherein:

Fig. 1 is a perspective view of a portion of a two-row cultivator adapted for cultivating a row crop equipped with my improved device for adjusting the relations between two gangs of shovels operating on opposite sides of a row.

Fig. 2 is a detail perspective view of portions of the lifting gear, a rachet plate being broken away to display the shaft-engaged end of a lever adapted to lift and lower the shovel gangs.

Fig. 3 is an elevation of a rocking shaft and the lever from the opposite side to that shown in Fig. 2.

Referring in detail to the drawings:

1 designates generally a frame including transverse bars 2 and 3, and a longitudinal beam 4, pivotally supported by wheels 5.

6 designates a beam arch having spaced legs 7 and 8 provided with oppositely extending lateral spindles 9, each rotatably supporting pivot castings 10 and 11 having arms 12 and 13 to which are attached inner and outer beams 14 and 15 connected by apertured spacers 16 and 17 and having clamp sockets 18 to slidably receive shanks 19 of shovels 20. The shanks are adjustably retained in the brackets by fasteners 21.

The shovels are thus supported by the pairs of beams 14 and 15 in the illustrated structure and the beams are pivotally supported by the arch member to provide spaced gangs for cultivating the ground on each side of a row.

Mounted in selected apertures of the spacers are the bent ends of lifting rods 22 and 23 having upper bent ends pivotally connected respectively to an ear 24 on an angular arm 25 of a rocking shaft 26, and to a link 27 rotatively mounted on the opposite end of said shaft. A lever 28 is adapted as presently described to rock the shaft and link to lift and lower the gangs, and retain the same in operating positions.

The shaft extends transversely of the frame, and is supported in a bearing bracket 29 on the frame adjacent the leg 7 of the arch, and a bearing bracket 30 on the frame having a ratchet 31 to receive a plunger 32 for latching the lever.

The inner end of the shaft extends beyond the bearing bracket 30 and a lever sleeve 33 mounted on said shaft end spaces the link 27 from the bearing bracket 30 and has a radial arm 34 provided with a longitudinal edge flange 35 forming a seat for the lever 28 to which the lever is attached by bolts 36. A depending rocker arm 37 fixed to the inner end of the sleeve has a lateral ear 38 having a slot 39 to slidably receive a spring rod 40 extending at right angles from the link 27, and a spring 41 on the rod bears oppositely against the ear and a pin 42 in the end of the rod, whereby the arm when rocked by the lever may swing the link to operate the left hand gang in Fig. 1.

Attention is called to the fact that the movement of the left hand gang has a constant relation to the movement of the lever, also that the ear 38 acts as a stop member for the link 27 as it prevents movement thereof in one direction regardless of the position in which it may have been placed by the lever 28.

In order to enable the lever to operate the rocker shaft for lifting and lowering the right hand gang, a sleeve 43 having apertures 44 is keyed by a pin 45 to the shaft on the opposite side of the bracket 30 from the lever sleeve for supporting a crank 46 integral with the sleeve, and a spring rod 47 comprising a bolt having an eye 48 mounted on a pin 49 at the outer end of the crank has a threaded upper end projecting through a bracket ear 50 projecting from a plate 51 fixed to the lever 28 by a bolt 52 and to the arm 34 by one of the bolts by which the lever is secured to the arm, and a thumb nut 53 is mounted on the protruding end of the bolt. A spring 54 mounted on the spring bolt bears oppositely against the bracket ear and the loop-like head of the bolt, and a washer 55 may be inserted between the nut and the ear. The crank is thus responsive to movement of the lever for rocking the shaft to lift or lower the right hand gang, and the relation of the gangs may be varied by adjusting the nut to vary the length and tension of the spring 54.

The plate 51 is preferably wider than the lever and has an edge flange 56 extended to engage one side edge of the lever, and a longitudinal groove 57 to accommodate the latching rod, and is provided with a depending wing 58 having an arcuate lower edge 59 conforming to the contour of the edge of the ratchet, the plate cooperating with the lever and arm 34 to form a guide for the latching rod.

In using the invention, the thumb screw on the spring rod 47 will be manipulated to adjust the length and tension of the spring for supporting the right hand gang at the same elevation as the left hand gang. The sleeve 43 may be adjusted rotatively on the rocker shaft and the pin 45 inserted in suitable apertures 44 for further adjusting the relative positions of the two gangs.

When the lever is operated the rocker arm will move the left hand gang and the lever bracket will operate on the crank to rock the shaft for moving the right hand gang and the two gangs will be moved pivotally by the single lever to an equal extent. When the lever is locked, the two gangs will therefore be maintained at the same elevation and will penetrate the ground to an equal extent, assuming that the ground surfaces on each side of the row extend in the same plane.

Should it be desirable to cause one gang of shovels to move at a different elevation than the opposite gang, for example to compensate for differences in the ground surfaces on the two sides of the row, the thumb screw may be manipulated to vary the tension of the spring on the rod 47 to support the right hand gang above or below the elevation of the left hand gang, and to cause the lever to move the right hand gang to a lower or higher position with reference to the ground surface than the left hand gang.

What I claim and desire to secure by Letters Patent is:

1. In combination with a cultivator including a frame and a pair of shovel-supporting beams pivotally mounted on the frame, a rotatable shaft mounted on the frame and connected to one of said beams, a lever rotatively mounted on the shaft connected with the other of said beams for pivotally moving the same, and a crank keyed to said shaft and having adjustable resilient connection with said lever for enabling the lever to rock the shaft for pivotally moving the first named beam.

2. A device of the character described including in combination with a cultivator having a plurality of pairs of shovel-supporting beams having separate pivotal mounting on the cultivator to form gangs, a rotatable shaft mounted on the cultivator having an angularly extending arm connected to one of said gangs for pivotally moving the same, a lever on said shaft having an arm connected to another of said gangs for pivotally moving the same, a crank keyed to said shaft, and adjustable means yieldingly connecting the lever with the crank for enabling the lever to oscillate the shaft for pivotally moving the first named gang.

3. A device of the character described including in combination with a cultivator having a plurality of shovel-supporting beams having separate pivotal mounting on the cultivator, a rotatable shaft mounted on the cultivator having an angularly extending arm connected to one of said beams for pivotally moving the same, a lever on said shaft having an arm connected to another of said beams for pivotally moving the same, a crank keyed to said shaft, a bracket on the lever, a bolt pivoted to the crank and slidable in the bracket, and a spring on said bolt bearing oppositely against the crank and the bracket for enabling the lever to rock the shaft for pivotally moving the first named beam.

4. A device of the character described including in combination with a cultivator having a plurality of shovel-supporting beams having separate pivotal mounting on the cultivator, a rotatable shaft mounted on the cultivator having an angularly extending arm connected to one of said beams for pivotally moving the same, a lever on said shaft having an arm connected to another of said beams for pivotally moving the same, a crank keyed to said shaft, means including a spring connecting the lever with the crank for enabling the lever to rock the shaft for pivotally moving the first named beam, and means for adjusting the compressive effect of said spring.

5. In a cultivator including a frame and a pair of shovel-supporting beams pivotally mounted on the frame, a lifting mechanism comprising a shaft rotatably mounted on the frame and connected to one of said beams, a lever on said shaft having an arm, a link yieldingly connected to said arm and operably connected with the other of said beams, a crank keyed to said shaft, and means for connecting the crank with the lever for enabling the lever to rock the shaft for pivotally moving the first named beam.

6. In a cultivator including a frame and a pair of shovel-supporting beams pivotally mounted on the frame, a lifting mechanism comprising a rotatable shaft mounted on the frame and operably connected with one of said beams, a lever on said shaft having an arm, a stop member on the arm, a link pivotally connected to said arm and operably connected with the other of said beams, yielding means for normally maintaining the link in abutting relation with said stop member, a crank keyed to said shaft, and means for connecting the crank with the lever for enabling the lever to rock the shaft for pivotally moving the first named beam.

7. In a cultivator including a frame and a pair of shovel-supporting beams pivotally mounted on the frame, a lifting mechanism comprising a rotatable shaft mounted on the frame and operably connected with one of said beams, a lever on said shaft having an arm, a stop member on the arm, a link pivotally connected to said arm and operably connected with the other of said beams, yielding means for normally maintaining the link in abutting relation with said stop member, and a crank keyed to said shaft and having adjustable resilient connection with said lever for enabling the lever to rock the shaft for pivotally moving the first named beam.

In testimony whereof I affix my signature.

SILAS E. BAILOR.